United States Patent
Hara et al.

(10) Patent No.: US 7,322,439 B2
(45) Date of Patent: Jan. 29, 2008

(54) STEERING APPARATUS FOR STEERABLE VEHICLE

(75) Inventors: Kazuo Hara, Kanagawa (JP); Noriki Kubokawa, Kanagawa (JP); Kiyotaka Shitamitsu, Kanagawa (JP); Tetsuya Osonoi, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 78 days.

(21) Appl. No.: 11/152,206

(22) Filed: Jun. 15, 2005

(65) Prior Publication Data

US 2005/0279562 A1   Dec. 22, 2005

(30) Foreign Application Priority Data

Jun. 17, 2004   (JP) ............................. 2004-180014

(51) Int. Cl.
*B62D 5/04* (2006.01)
*B62D 6/04* (2006.01)

(52) U.S. Cl. ...................... 180/402; 180/405; 180/446; 701/41; 701/42; 701/43

(58) Field of Classification Search ................ 180/402, 180/446, 405; 701/41, 42, 43
See application file for complete search history.

(56) References Cited

U.S. PATENT DOCUMENTS 5,884,724 A   3/1999   Bohner et al.
7,007,769 B2 *   3/2006   Hara et al. .................. 180/402
2005/0045413 A1 *   3/2005   Shitamitsu et al. ......... 180/402
2005/0082108 A1 *   4/2005   Husain ........................ 180/402
2005/0178606 A1 *   8/2005   Husain et al. .............. 180/408

FOREIGN PATENT DOCUMENTS

| FR | 2 856 973 A1 | 1/2005 |
|----|--------------|--------|
| GB | 2 341 587 A | 3/2000 |
| GB | 2 361 899 A | 11/2001 |
| JP | 2001-088727 A | 4/2001 |
| JP | 2001-171543 A | 6/2001 |

* cited by examiner

*Primary Examiner*—Lesley D. Morris
*Assistant Examiner*—Marlon Arce-Diaz
(74) *Attorney, Agent, or Firm*—Foley & Lardner LLP

(57) ABSTRACT

A steering apparatus for a steerable vehicle includes a steering unit, an operating unit, a backup unit, and a control unit. The backup unit selectively connects/disconnects the steering unit and the operating unit. The control unit is operable in two control modes including an SBW mode and a PS mode. In the SBW mode, the control unit separates the steering unit from the operating unit; controls a steer angle of the vehicle in accordance with a manual steering effort; and switches the control mode from the SBW mode to the PS mode when an SBW-to-PS mode switch condition is satisfied, the SBW-to-PS mode switch condition including a condition that the steer angle is larger than or equal to a first threshold angle. In the PS mode, the control unit connects the steering unit and the operating unit; controls an assist steering effort to boost the manual steering effort.

18 Claims, 12 Drawing Sheets

STEERING APPARATUS FOR STEERABLE VEHICLE

BACKGROUND OF THE INVENTION

The present invention relates generally to steering apparatuses or systems for steerable vehicles, and more particularly to a steering apparatus for a steerable vehicle which is equipped with a backup unit for selectively and mechanically connecting and disconnecting a steering unit and an operating unit.

A Published Japanese Patent Application No. 2001-171543 (hereinafter referred to as "JP2001-171543") shows a motor-driven steering device which includes a steering wheel, a steering mechanism, a clutch for selectively connecting and disconnecting the steering wheel and the steering mechanism, a steering motor, and a feedback motor. When a steer angle of a vehicle equipped with the steering device reaches a maximum steer angle with a rack shaft being in contact with a rack stopper in a steer-by-wire mode in which the steering wheel is mechanically disconnected from the steering mechanism, a controller engages the clutch to connect the steering wheel and the steering mechanism, and sets the output torques of the feedback motor and the steering motor to zero.

SUMMARY OF THE INVENTION

The steering device shown in JP2001-171543 is intended for providing a large reaction force under a condition in which the steer angle is at the maximum without employing a feedback motor whose capacity is large. However, the steering device is configured to move the steering rack by means of the steering motor without mechanically connecting the steering wheel and the steering mechanism until the steering rack reaches the rack stopper. Under a condition in which the vehicle speed is at or near zero and the steer angle is at or near the maximum, a required effort for movement of the steering rack is large. Therefore, the capacity of the steering motor is designed to be large.

Accordingly, it is an object of the present invention to provide a steering apparatus for a steerable vehicle which is configured to perform steer-by-wire control with a steering motor whose capacity is small.

According to one aspect of the present invention, a steering apparatus for a steerable vehicle, comprises: a steering unit configured to generate an assist steering effort to regulate a steer angle of the vehicle; an operating unit configured to receive a manual steering effort; a backup unit configured selectively to mechanically connect the steering unit and the operating unit, and to mechanically separate the steering unit from the operating unit; and a control unit connected electrically for signal communication to the steering unit, the operating unit, and the backup unit, and operable in at least two control modes including an SBW mode and a PS mode, the control unit being configured to perform the following in the SBW mode: mechanically separating the steering unit from the operating unit; controlling the steer angle in accordance with the manual steering effort; and switching the control mode from the SBW mode to the PS mode when an SBW-to-PS mode switch condition is satisfied, the SBW-to-PS mode switch condition including a condition that the steer angle is larger than or equal to a first threshold angle, and the control unit being configured to perform the following in the PS mode: mechanically connecting the steering unit and the operating unit; controlling the assist steering effort to boost the manual steering effort; and switching the control mode from the PS mode to the SBW mode when a PS-to-SBW mode switch condition is satisfied, the PS-to-SBW mode switch condition including a condition that the steer angle is smaller than or equal to a second threshold angle.

According to another aspect of the invention, a steering apparatus for a steerable vehicle, comprises: a steering unit configured to generate an assist steering effort to regulate a steer angle of the vehicle; an operating unit configured to receive a manual steering effort; a backup unit configured selectively to mechanically connect the steering unit and the operating unit, and to mechanically separate the steering unit from the operating unit; and a control unit connected electrically for signal communication to the steering unit, the operating unit, and the backup unit, the control unit being configured to perform the following: controlling the steer angle in accordance with the manual steering effort, with the backup unit mechanically separating the steering unit from the operating unit, when a steering effort required to control the steer angle is relatively small; and controlling the assist steering effort to boost the manual steering effort, with the backup unit mechanically connecting the steering unit and the operating unit, when the required steering effort is relatively large.

According to a further aspect of the invention, a steering apparatus for a steerable vehicle, comprises: steering means for generating an assist steering effort to regulate a steer angle of the vehicle; operating means for receiving a manual steering effort; backup means for selectively mechanically connecting the steering means and the operating means, and mechanically separating the steering means from the operating means; and control means for being operable in at least two control modes including an SBW mode and a PS mode, for performing the following in the SBW mode: mechanically separating the steering unit from the operating means; controlling the steer angle in accordance with the manual steering effort; and switching the control mode from the SBW mode to the PS mode when an SBW-to-PS mode switch condition is satisfied, the SBW-to-PS mode switch condition including a condition that the steer angle is larger than or equal to a first threshold angle, and for performing the following in the PS mode: mechanically connecting the steering means and the operating means; controlling the assist steering effort to boost the manual steering effort; and switching the control mode from the PS mode to the SBW mode when a PS-to-SBW mode switch condition is satisfied, the PS-to-SBW mode switch condition including a condition that the steer angle is smaller than or equal to a second threshold angle.

According to a still further aspect of the invention, a method of controlling a steering apparatus for a steerable vehicle, the steering apparatus including a steering unit configured to generate an assist steering effort to regulate a steer angle of the vehicle, an operating unit configured to receive a manual steering effort, and a backup unit configured selectively to mechanically connect the steering unit and the operating unit, and to mechanically separate the steering unit from the operating unit, comprises: operating in at least two control modes including an SBW mode and a PS mode; performing the following in the SBW mode: mechanically separating the steering unit from the operating unit; controlling the steer angle in accordance with the manual steering effort; and switching the control mode from the SBW mode to the PS mode when an SBW-to-PS mode switch condition is satisfied, the SBW-to-PS mode switch condition including a condition that the steer angle is larger than or equal to a first threshold angle; and performing the following in the PS mode: mechanically connecting the steering unit and the operating unit; controlling the assist steering effort to boost the manual steering effort; and switching the control mode from the PS mode to the SBW mode when a PS-to-SBW mode switch condition is satisfied, the PS-to-SBW mode switch condition including a condition that the steer angle is smaller than or equal to a second threshold angle.

The above objects and other objects, features, and advantages of the present invention are readily apparent from the following detailed description of the best modes for carrying out the invention when taken in connection with the accompanying drawings.

DETAILED DESCRIPTION OF THE INVENTION

Figure 1:
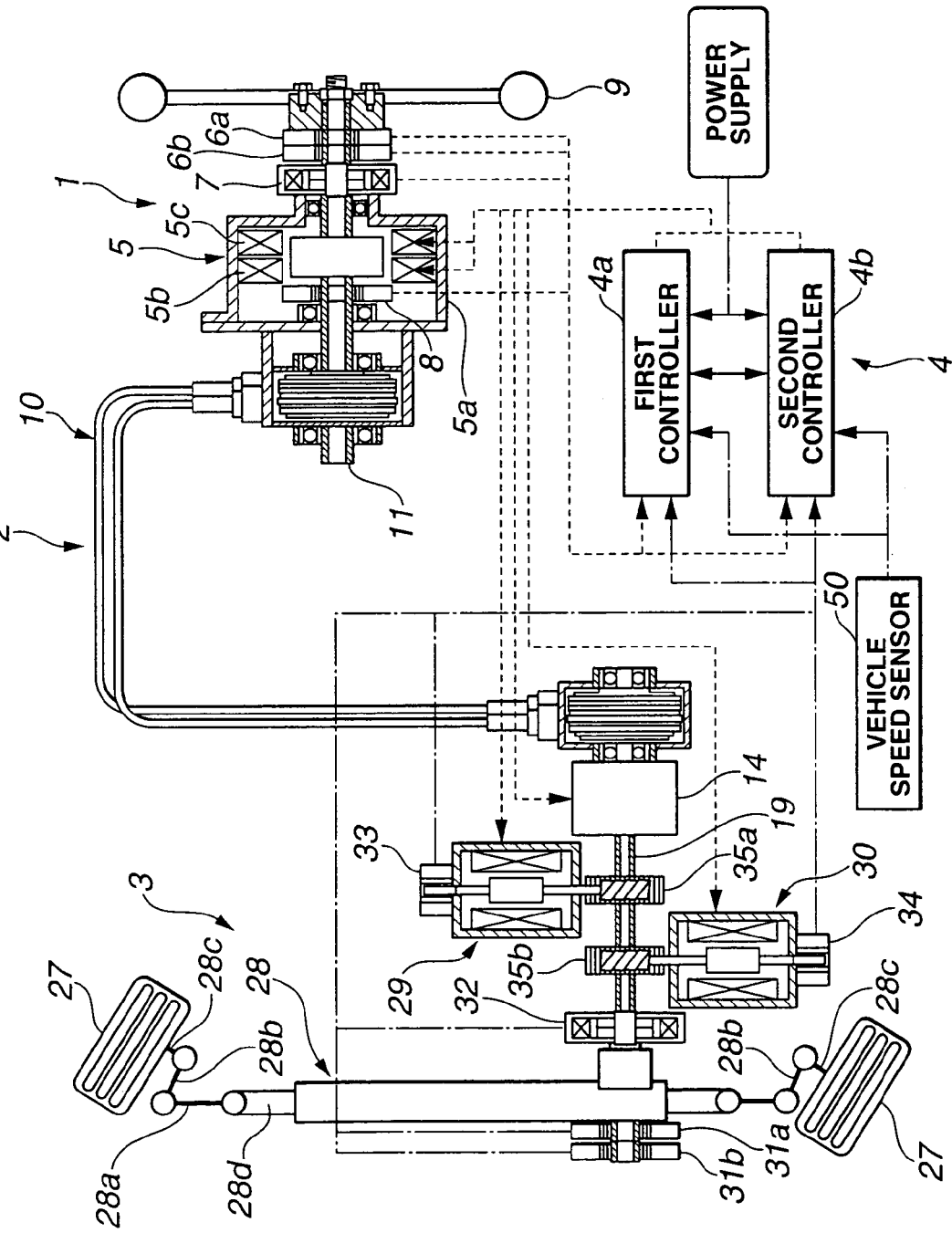
FIG. 1 is a schematic diagram depicting an automotive vehicle equipped with a steering apparatus in accordance with a first embodiment of the present invention.

Referring now to FIGS. 1 thorough 9, there is shown a steering apparatus for a steerable vehicle in accordance with a first embodiment of the present invention. FIG. 1 is a schematic diagram depicting an automotive vehicle equipped with the steering apparatus in accordance with the first embodiment. This steering apparatus is comprised of a redundant steer-by-wire (SBW) system with a backup system in order to provide a fail-safe feature. Specifically, the steering apparatus includes a pair of control channels each of which includes sensors, a steering device, and a controller for controlling the steering device. As shown in FIG. 1, the steering apparatus includes an operating unit (steering wheel) 9, a feedback unit 1, a backup unit 2, a steering unit 3, and a control unit 4.

Feedback unit 1 is mechanically connected to backup unit 2 and steering wheel 9. Feedback unit 1 includes a feedback motor 5 as a feedback actuator, a redundant pair of steering wheel angle sensors 6a, 6b, a torque sensor 7, and a rotary encoder 8. Feedback motor 5 is comprised of an electric motor including a casing 5a and an upper steering shaft 11 as an output shaft rotatably supported on casing 5a. Casing 5a is fixed to the body of the vehicle with a bracket. The upper end of upper steering shaft 11 is solidly coupled to steering wheel 9. Torque sensor 7 is disposed between feedback motor 5 and steering wheel 9, and configured to measure a steering wheel torque applied to steering wheel 9 and thereby to upper steering shaft 11. Steering wheel angle sensors 6a, 6b are comprised of absolute resolvers, which are disposed between torque sensor 7 and steering wheel 9. Thus, steering wheel angle sensors 6a, 6b are arranged to measure the angular position of steering wheel 9 without errors caused by torsion of torque sensor 7. Rotary encoder 8 is disposed around upper steering shaft 11 within casing 5a to measure the angular position of feedback motor 5.

More specifically, feedback motor 5 includes a redundant pair of stators 5b, 5c within casing 5a, in order to provide a fail-safe feature. Even if one of stators 5b, 5c fails to be energized for some reasons, feedback motor 5 operates to generate a desired torque with the other of stators 5b, 5c energized. Feedback motor 5 is comprised of a brushless motor, with stators 5b, 5c each equipped with a Hall IC 13 shown in FIG. 5. Feedback motor 5 is controlled in accordance with a sensing signal from Hall IC 13. However, it is possible that feedback motor 5 generates fluctuations in the motor torque to adversely affect the feedback torque. Accordingly, in this embodiment, feedback motor 5 is controlled in accordance with a sensing signal from rotary encoder 8 in addition to the sensing signal from Hall IC 13. This reduces fluctuations in the motor torque to improve the quality of the feedback torque.

Figure 2:
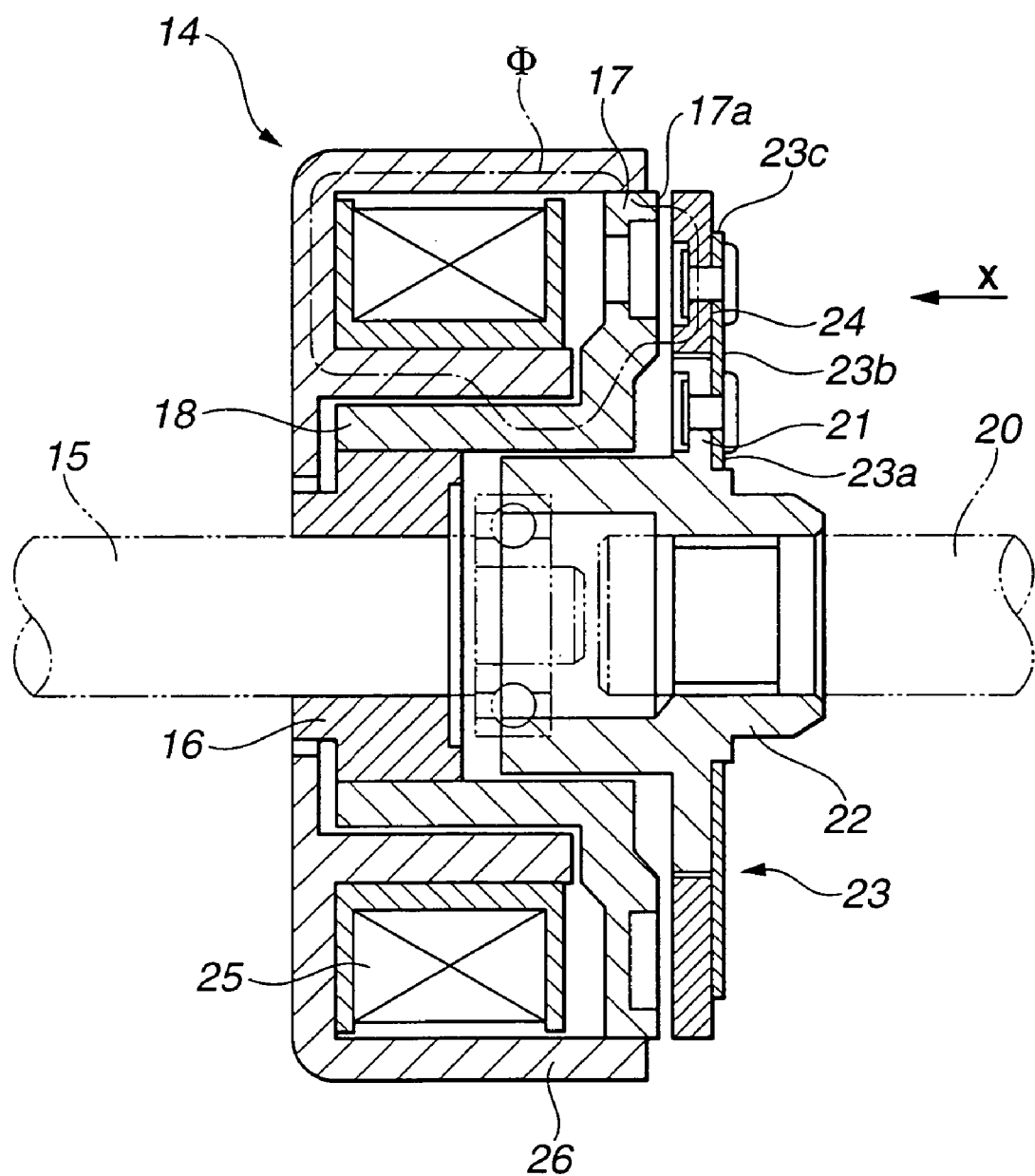
FIG. 2 is a longitudinal sectional view of an electromagnetic clutch 14 employed in the steering apparatus of FIG. 1.

Backup unit 2 is configured selectively to mechanically connect steering unit 3 and steering wheel 9 for mechanical energy transmission, and to mechanically separate or disconnect steering unit 3 from steering wheel 9. Backup unit 2 includes a cable mechanism 10, and an electromagnetic clutch 14. FIG. 2 is a longitudinal sectional view of electromagnetic clutch 14. As shown in FIG. 2, electromagnetic clutch 14 includes a boss 16, a rotor 18, an armature hub 22, an armature 24, and a yoke 26. Rotor 18 is attached via boss 16 for rotation therewith to a lower shaft 15, which is connected for rotation therewith to lower steering shaft 19 as shown in FIG. 1. Armature hub 22 includes a splined opening engaged with a splined upper shaft 20, which is connected to cable mechanism 10. Armature hub 22 includes a flange 21 radially extending. Flange 21 of armature hub 22 is connected via a leaf spring 23 to armature 24, which is disposed radially outside of flange 21. Rotor 18 includes a flange 17 radially extending. Armature 24 is facing a contact surface 17a of flange 17 of rotor 18. Yoke 26 is disposed radially outside of rotor 18 and fixed to a column housing (not shown) or the vehicle body. Yoke 26 accommodates an electromagnetic coil 25. Leaf spring 23 is formed into an annular shape comprised of a base portion 23*a*, a bridge portion 23*b*, and a free end portion 23*c*. Base portion 23*a* of leaf spring 23 is fixed to the surface of flange 21 of armature hub 22 which is farer from yoke 26. Bridge portion 23*b* of leaf spring 23 radially extends from base portion 23*a*. Free end portion 23*c* is fixed to the surface of armature 24 which is farer from yoke 26.

With electromagnetic coil 25 being energized, a magnetic flux Φ is generated in electromagnetic clutch 14. As shown by a dash-and-dotted line in FIG. 2, magnetic flux Φ extends within yoke 26, rotor 18, and armature 24. With magnetic flux Φ present, armature 24 is biased against leaf spring 23 to be in contact with flange 17 of rotor 18, so that upper shaft 20 is drivingly connected to lower shaft 15. Conversely, with electromagnetic coil 25 being de-energized, magnetic flux Φ vanishes so that armature 24 is brought to be out of contact with rotor 18 by means of leaf spring 23. The torque capacity of electromagnetic clutch 14 may be arbitrarily set by changing the design of electromagnetic coil 25 to adjust the magnitude of magnetic flux Φ.

Figure 3:
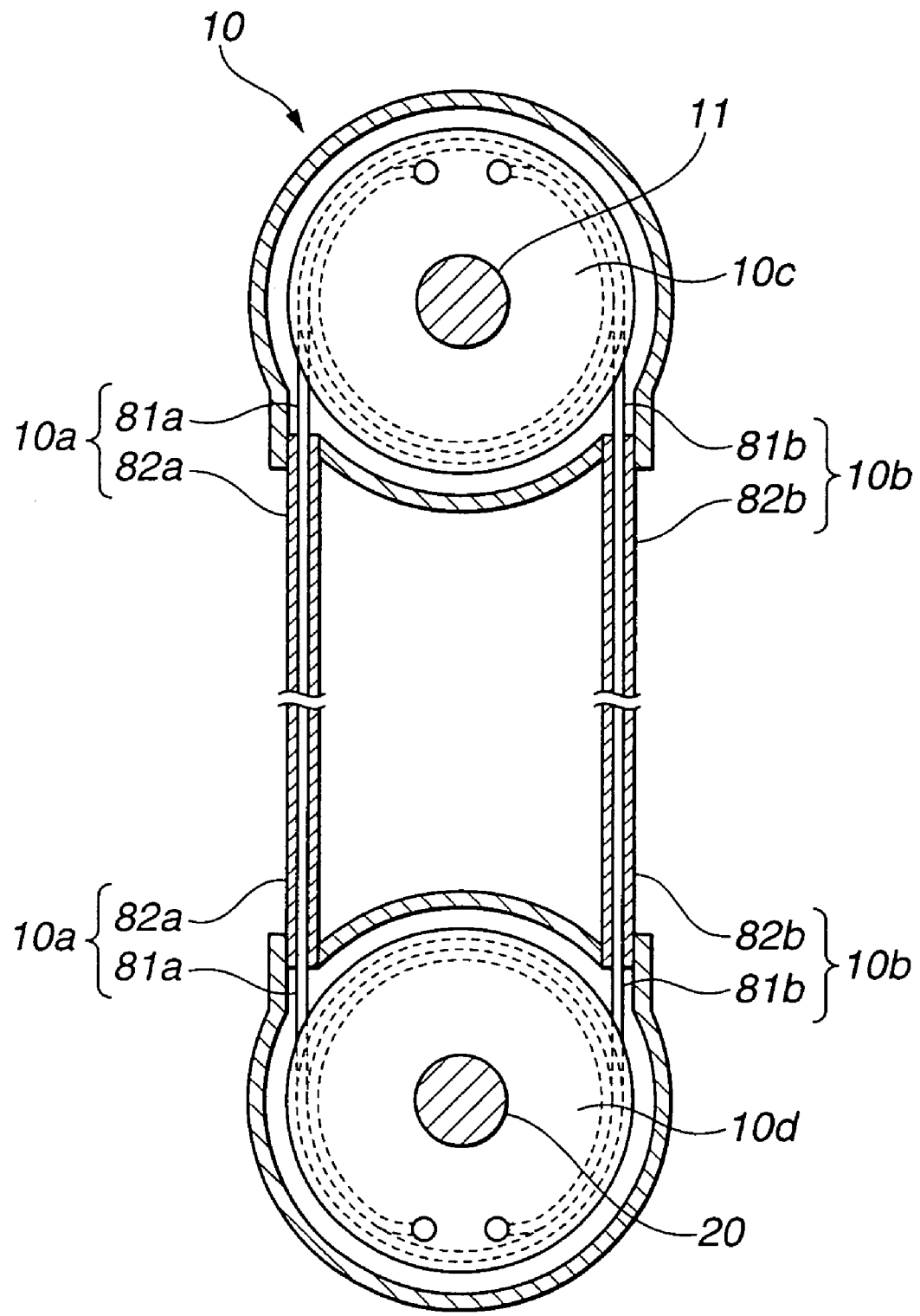
FIG. 3 is a cross sectional view of a cable mechanism 10 employed in the steering apparatus of FIG. 1.

FIG. 3 is a cross sectional view of cable mechanism 10 employed in backup unit 2. As shown in FIG. 3, cable mechanism 10 includes a cable 10*a*, a cable 10*b*, an upper cable reel 10*c*, and a lower cable reel 10*d*. Upper cable reel 10*c* is attached for rotation therewith to a lower end portion of upper steering shaft 11. Lower cable reel 10*d* is attached for rotation therewith to upper shaft 20. Cables 10*a*, 10*b* are wound on upper cable reel 10*c* and lower cable reel 10*d*. Cables 10*a*, 10*b* includes inner cables 81*a*, 81*b*, and flexible guide tubes 82*a*, 82*b*. Guide tubes 82*a*, 82*b* accommodates and guides inner cables 81*a*, 81*b*. One end portions of inner cables 81*a*, 81*b* are wounded by upper cable reel 10*c* in different directions at different longitudinal positions longitudinally spaced. The other end portions of inner cables 81*a*, 81*b* are also wounded by lower cable reel 10*d* in different directions at different longitudinal positions longitudinally spaced. With electromagnetic clutch 14 being engaged, when steering wheel 9 is turned, one of cables 10*a*, 10*b* serves to transmit the steering wheel torque to front road wheels 27, 27, and the other cable serves to transmit the reaction torque from front road wheels 27, 27 to steering wheel 9. Configured as mentioned above, backup unit 2 serves for steering effort transmission like a typical shaft steering device. Incidentally, steering effort refers to steering force, steering torque, or other efforts for steering, in the shown embodiments.

Referring back to FIG. 1, steering unit 3 includes a steering rack assembly 28, a redundant pair of steering motors 29, 30, a redundant pair of steer angle sensors 31*a*, 31*b*, a torque sensor 32, and a redundant pair of rotary encoders 33, 34.

Steering rack assembly 28 includes a rack 28*a*, tie rods 28*b*, 28*b*, knuckle arms 28*c*, 28*c*, and housing 28*d*. Extending in the lateral direction of the vehicle, rack 28*a* is supported on housing 28*d* for sliding in the lateral direction of the vehicle. Knuckle arm 28*c* carries front road wheel 27. Tie rod 28*b* links the end of rack 28*a* and knuckle arm 28*c*. Rack 28*a* includes a central portion formed as a rack gear (not shown) which is engaged with a pinion gear (not shown) formed or disposed on lower steering shaft 19.

First and second steering motors 29, 30 are disposed between electromagnetic clutch 14 and steering rack assembly 28, and configured to rotate lower steering shaft 19 through worm gears 35*a*, 35*b*, respectively. Like feedback motor 5, steering motors 29, 30 are comprised of brushless motors having stators equipped with Hall ICs 36 shown in FIG. 5. Rotary encoders 33, 34 are disposed around the output shafts of steering motors 29, 30 to measure the angular positions of steering motors 29, 30.

Torque sensor 32 is attached to a portion of lower steering shaft 19 between steering rack assembly 28 and second steering motor 30. Steer angle sensors 31*a*, 31*b* are comprised of absolute resolvers configured to measure the angular position of lower steering shaft 19, or the average steer angle of front road wheels 27, 27. Steer angle sensors 31*a*, 31*b* are disposed in a lower end portion of lower steering shaft 19. Accordingly, steer angle sensors 31*a*, 31*b* measure the angular position of steering wheel 9 without errors caused by torsion at torque sensor 32.

With electromagnetic clutch 14 being engaged, the steering wheel torque is transmitted from steering wheel 9 via lower steering shaft 19 to steering rack assembly 28.

Figure 4:
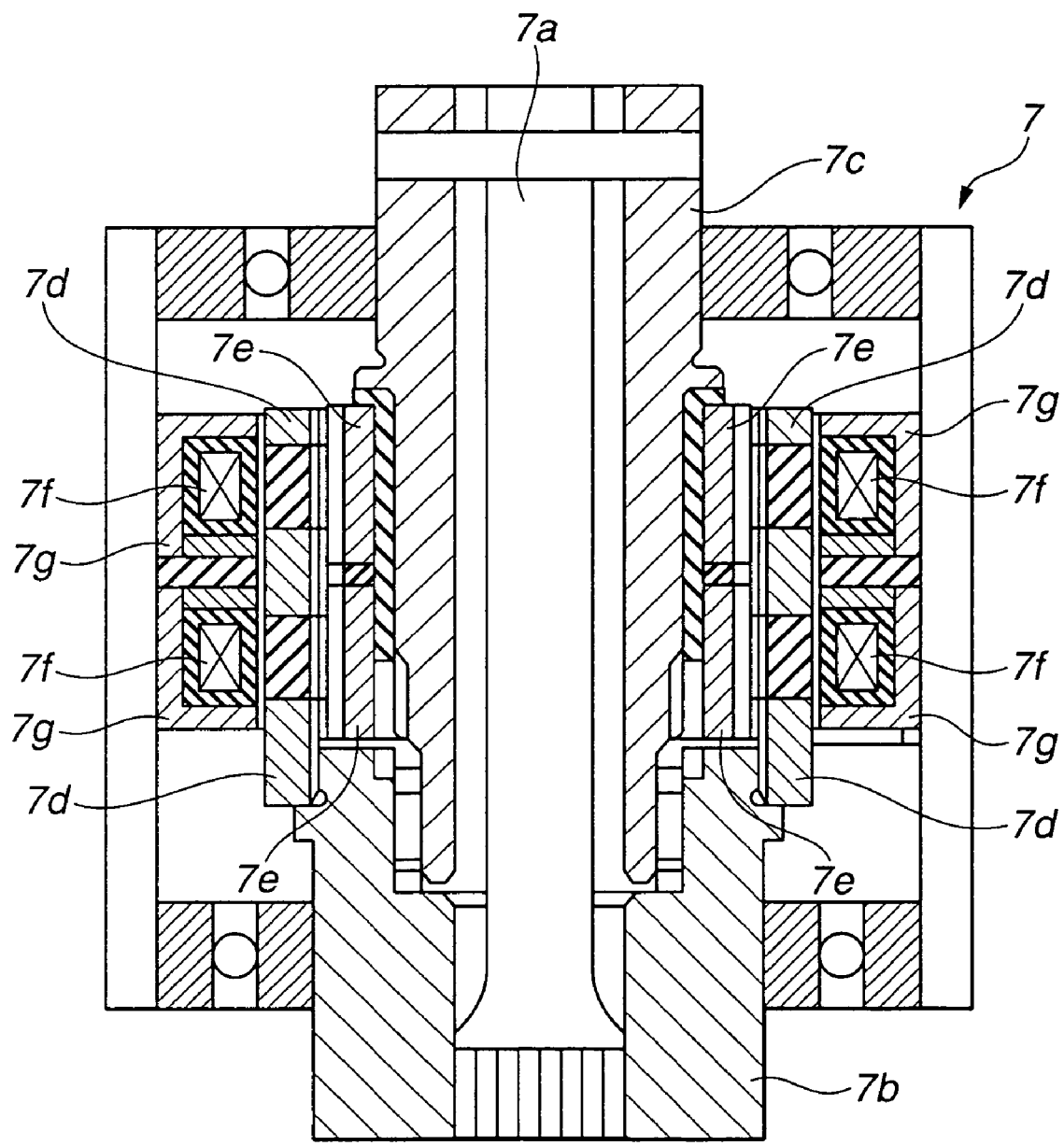
FIG. 4 is a longitudinal sectional view of a torque sensor 7 employed in the steering apparatus of FIG. 1.

FIG. 4 is a longitudinal sectional view of torque sensor 7. Torque sensor 7 includes a torsion bar 7*a*, a first shaft 7*b*, a second shaft 7*c*, a first magnetic body 7*d*, a second magnetic body 7*e*, a coil 7*f*, and a third magnetic body 7*g*. Torsion bar 7*a* extends in the longitudinal axis of upper steering shaft 11. First shaft 7*b* has a lower end portion fixed to the lower end portion of torsion bar 7*a*. First magnetic body 7*d* is fixed to first shaft 7*b*. Second shaft 7*c* has a longitudinal axis along the longitudinal axes of torsion bar 7*a* and first shaft 7*b*. Second shaft 7*c* has an upper end portion fixed to the upper end portion of torsion bar 7*a*. Second magnetic body 7*e* is fixed to second shaft 7*c*. Coil 7*f* is disposed radially outside of first magnetic body 7*d*. Third magnetic body 7*g* is disposed radially outside of coil 7*f*. First magnetic body 7*d*, second magnetic body 7*e*, and third magnetic body 7*g* serve to form a magnetic circuit. In the above-mentioned structure, when torsion bar 7*a* is twisted, first magnetic body 7*d* rotates with respect to second magnetic body 7*e*. The relative displacement between first magnetic body 7*d* and second magnetic body 7*e* causes a change in the inductance of coil 7*f*. Torque sensor 7 includes two sets of first magnetic body 7*d*, second magnetic body 7*e*, coil 7*f*, and third magnetic body 7*g*, in order to provide a fail-safe feature. Torque sensor 7 detects two measured values and outputs the values to control unit 4. Torque sensor 32 includes the same structure as torque sensor 7.

Referring back to FIG. 1, control unit 4 includes a first controller 4*a*, and a second controller 4*b*. Controllers 4*a*, 4*b* are each generally comprised of a microcomputer. Controllers 4*a*, 4*b* each include an input/output interface (I/O), memories (RAM, ROM), and a microprocessor or a central processing unit (CPU). The input/output interface (I/O) receives input information from engine/vehicle sensors. The central processing unit (CPU) allows the access by the I/O interface of input informational data signals from the previously-discussed engine/vehicle sensors. The CPU is responsible for carrying the steering control program stored in the memories and is capable of performing necessary arithmetic and logic operations. Computational results, that is, calculated output signals are relayed through the output interface circuitry of controllers 4*a*, 4*b* to output stages. Specifically, controllers 4*a*, 4*b* are each configured to receive sensing signals from feedback unit 1, namely, signals from steering wheel angle sensors 6*a*, 6*b*, two signals from torque sensor 7, a signal from rotary encoder 8, and a signal from Hall IC 13. Controllers 4*a*, 4*b* are also configured to receive sensing signals from steering unit 3, namely, signals from steer angle sensors 31*a*, 31*b*, two signals from torque sensor 32, signals from rotary encoders 33, 34, and a signal from Hall IC 36. In addition, controllers 4a, 4b are configured to receive signals from a vehicle speed sensor 50 which is configured to measure a longitudinal traveling speed of the vehicle by sensing and processing the rotational speeds of the road wheels.

Controllers 4a, 4b are configured to control feedback motor 5, steering motors 29, 30, and electromagnetic clutch 14, in accordance with the signals from the sensors. Controllers 4a, 4b are each configured to monitor or diagnose the condition of the other controller. In the first embodiment, first controller 4a is active in normal conditions, and second controller 4b is active in abnormal conditions in which first controller 4a does not operate normally.

Figure 5:
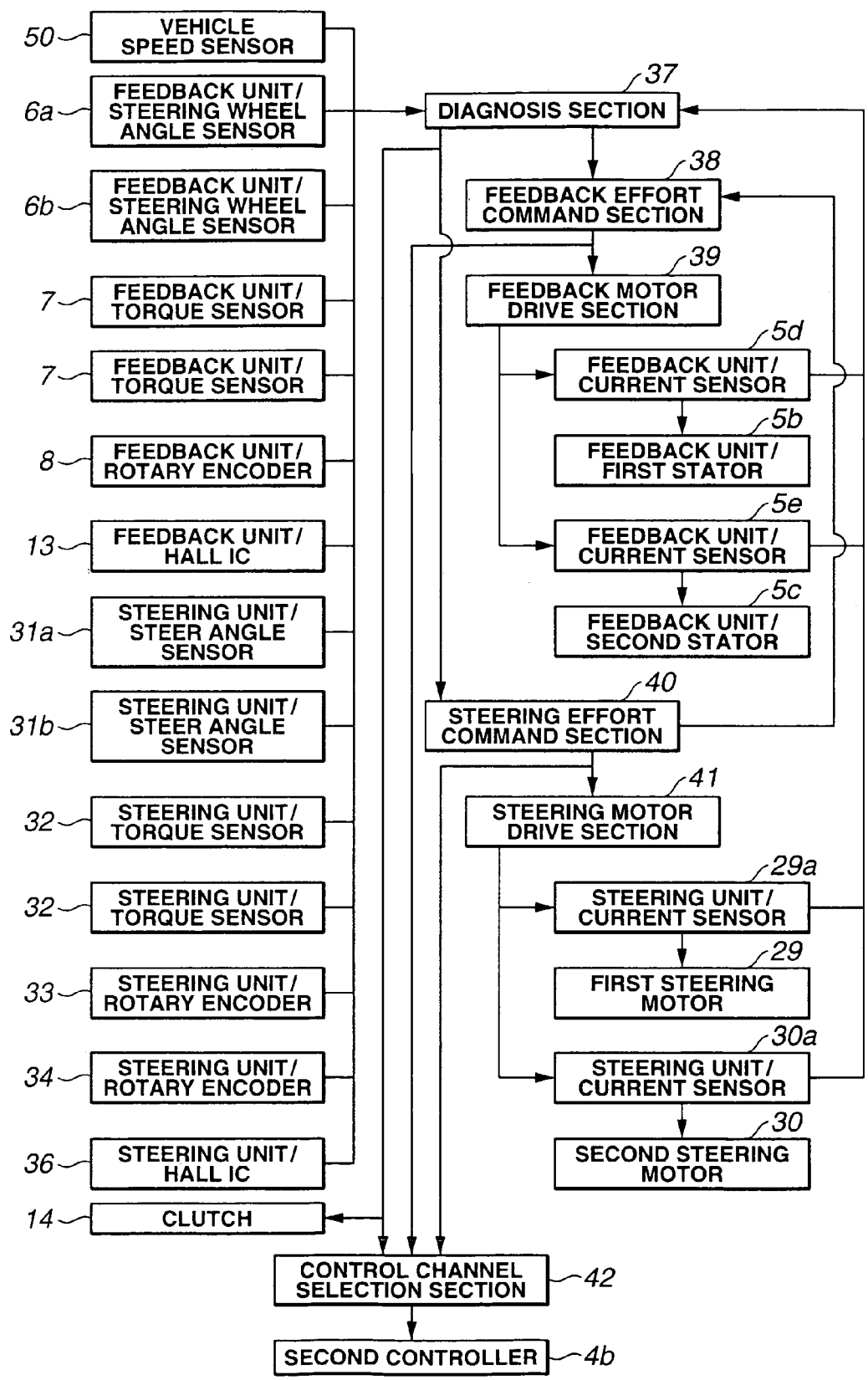
FIG. 5 is a system block diagram depicting a control system of the steering apparatus of FIG. 1.

FIG. 5 is a system block diagram depicting a is control channel of first controller 4a. Second controller 4b is substantially identical to or configured as first controller 4a. First controller 4a includes a diagnosis section 37, a feedback effort command section 38, a feedback motor drive section 39, a steering effort command section 40, a steering motor drive section 41, and a control channel selection section 42.

Diagnosis section 37 is configured to receive the sensing signals indicative of the measured values from the sensors, to process or adjust the measured values in accordance with a stored program, and to output signals indicative of the processed measured values to feedback effort command section 38, and to steering effort command section 40. The output signals are also input to control channel selection section 42. In addition, diagnosis section 37 is configured to determine whether or not there is a failure, a breakdown, or an abnormality disabling the SBW mode control, in accordance with the measured values. When it is determined that there is an abnormality, diagnosis section 37 outputs a control command to electromagnetic clutch 14 so that electromagnetic clutch 14 is engaged to mechanically connect steering wheel 9 and steering rack assembly 28. In this manner, even when there is an abnormality in the SBW mode control system of the steering apparatus, the steering apparatus steers front road wheels 27, 27 in accordance with manual steering effort.

Feedback effort command section 38 is configured to calculate a feedback effort command in accordance with the signal from diagnosis section 37, and to output the feedback effort command to feedback motor drive section 39 and control channel selection section 42.

Feedback motor drive section 39 is configured to calculate a driving current command in accordance with the feedback effort command, and output the driving current command to first stator 5b and second stator 5c. Current sensors 5d, 5e mounted in feedback motor 5 are configured to monitor the driving current, and to output the monitored driving current to diagnosis section 37.

Steering effort command section 40 is configured to calculate a steer angle command in accordance with the command signal from diagnosis section 37, and output the steer angle command to steering motor drive section 41, and control channel selection section 42.

Steering motor drive section 41 is configured to calculate a driving current command in accordance with the steering effort command, and output the driving current command to first steering motor 29 and second steering motor 30. Current sensors 39a, 30a mounted in first steering motor 29, and second steering motor 30 are configured to monitor the driving current, and to output the monitored driving current to diagnosis section 37.

Control channel selection section 42 is configured to receive signals from diagnosis section 37, feedback effort command section 38, and steering effort command section 40, to determine whether or not there is an abnormality in the sensors and first controller 4a, in accordance with the signals, and to output the state of first controller 4a to second controller 4b. Thus, even if there is an abnormality in the control channel of first controller 4a, the steering apparatus continues to perform the SBW mode control.

First controller 4a is operable in two control modes of a steer-by-wire (SBW) mode and a power-steering (PS) mode. First controller 4a is configured to switch the control mode from the SBW mode to the PS mode, when in the SBW mode, the state of the vehicle changes to be in a condition in which the vehicle speed is lower than or equal to a first threshold speed X (km/h) and the steer angle is larger than or equal to a first threshold angle Y (deg). First threshold speed X is generally set to be near zero. First threshold angle Y is generally set to be near the maximum steer angle which is a position mechanically defined by a rack stopper or a position defined arbitrarily in consideration of other factors. The PS mode being initialized, first controller 4a engages electromagnetic clutch 14, and starts to control the assist steering effort with steering motors 29, 30. First controller 4a is configured to set first threshold angle Y so that first threshold angle Y decreases with a decrease in the vehicle speed.

On the other hand, first controller 4a is configured to switch the control mode from the PS mode to the SBW mode, when in the PS mode, the state of the vehicle changes to be in a condition in which the vehicle speed is higher than a second threshold speed W (km/h) and the steer angle is smaller than a second threshold angle Z (deg). Second threshold speed W is set to be higher than first threshold speed X, and second threshold angle Z is set to be smaller than first threshold angle Y. The SBW mode being initialized, first controller 4a disengages electromagnetic clutch 14, and starts to control the steer angle with steering motors 29, 30.

Figure 6:
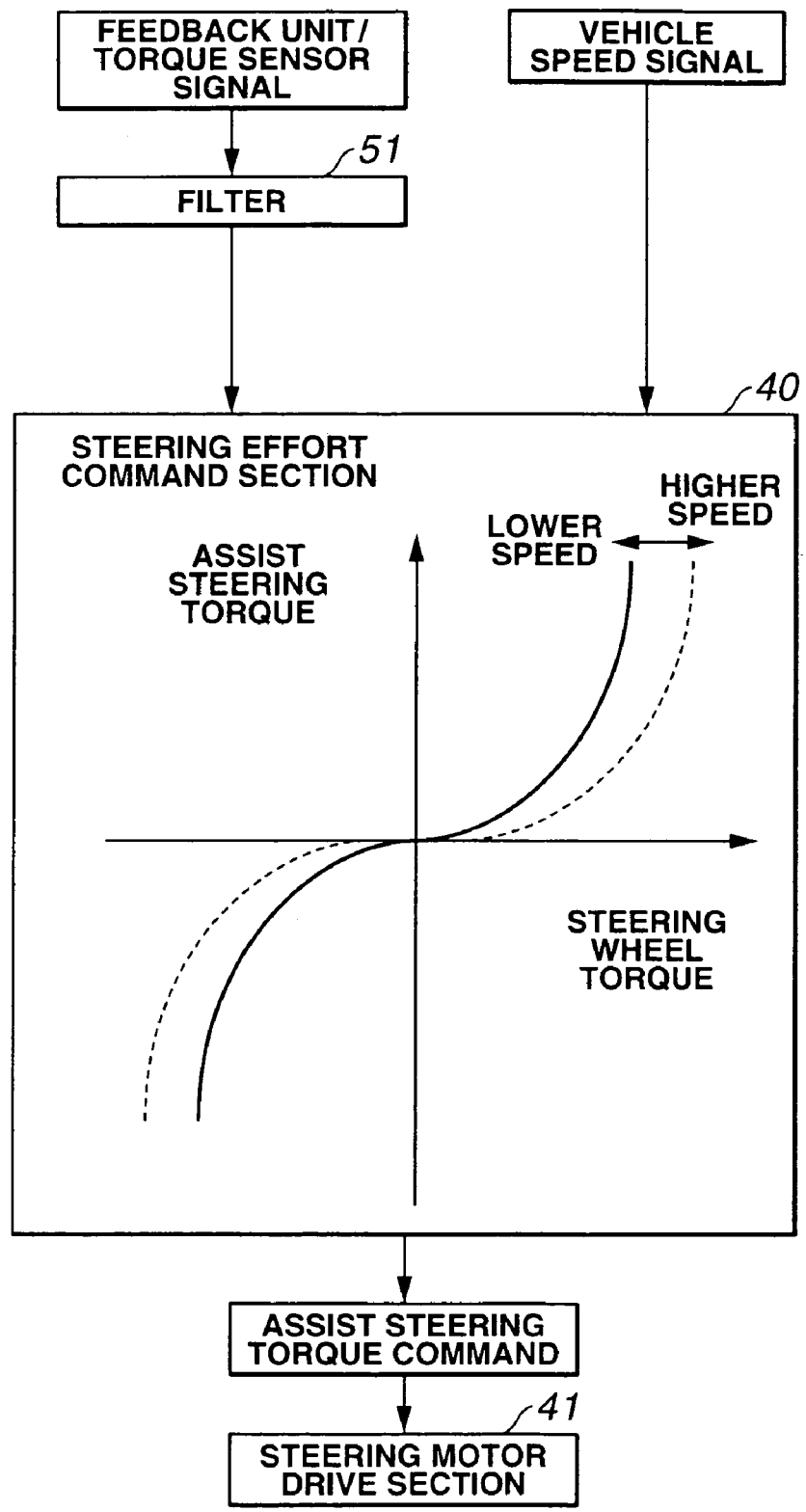
FIG. 6 is a system block diagram depicting how a steering effort command section 40 operates in the control system of FIG. 5 in a PS mode.

FIG. 6 is a system block diagram depicting how steering effort command section 40 operates in the PS mode. Steering effort command section 40 is configured to receive a signal from vehicle speed sensor 50, and a signal from torque sensor 7 of feedback unit 1 via a filter 51 for removing noise. Steering effort command section 40 is configured to determine the assist steering torque in accordance with the vehicle speed signal and the torque signal using a predetermined map shown in block 40 in FIG. 6, and to output the assist steering torque to steering motor drive section 41. The map is designed so that the assist steering torque increases with an increase in the steering wheel torque, and decreases with an increase in the vehicle speed. This characteristic serves for reducing a driver steering load, and for enhancing the vehicle stability at high speed.

Figure 7:
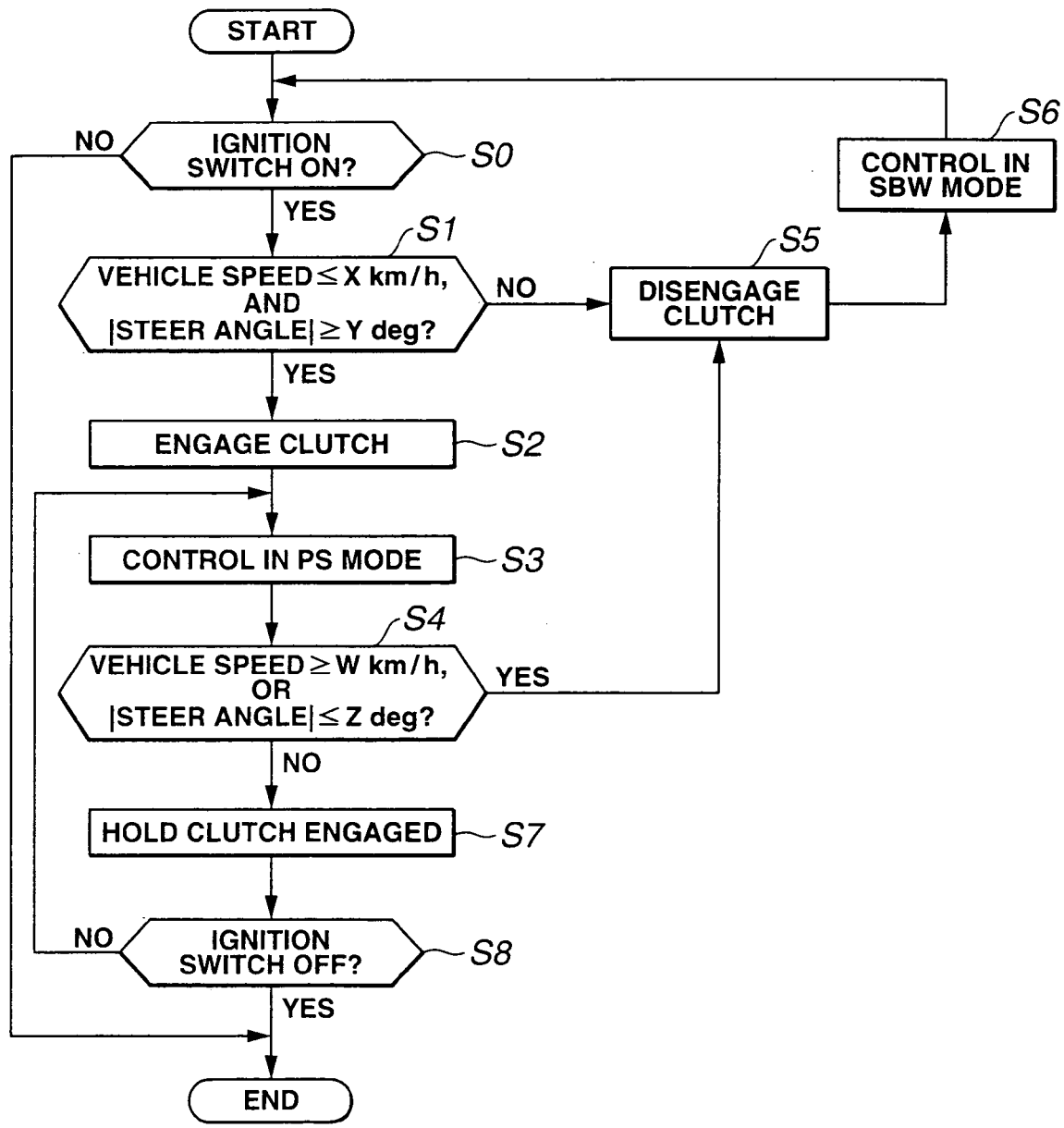
FIG. 7 is a flow chart depicting a routine executed by a first controller 4a employed in the steering apparatus of FIG. 1.

The following describes operations and behaviors of the steering apparatus. FIG. 7 is a flow chart depicting a routine executed by first controller 4a. The routine of FIG. 7 is repeatedly executed by first controller 4a at intervals of a predetermined processing time interval ΔT such as 10 ms, called by timer interrupt. Although steps of communications within first controller 4a is not shown in FIG. 7, processed data is stored in the memories, updating the previous data, and reference information is read from the memories, as occasion arises. As shown in FIG. 7, first, at step S0, first controller 4a determines whether or not the ignition switch is ON. When the answer to step S0 is affirmative (YES), the routine proceeds to step S1. On the other hand, when the answer to step S0 is negative (NO), the routine returns. At step S1, first controller 4a determines whether or not the vehicle speed is lower than or equal to first threshold speed X and the steer angle of front road wheels 27, 27 is larger than or equal to first threshold angle Y. When the answer to step S1 is YES, the routine proceeds to step S2. On the other hand, when the answer to step S1 is NO, the routine proceeds to step S5. At step S2, first controller 4a engages electromagnetic clutch 14. Subsequent to step S2, at step S3, first controller 4a performs the PS mode control by holding feedback motor 5 at rest, and by operating steering motors 29, 30 in accordance with the map as shown in FIG. 6. Subsequent to step S4, first controller 4a determines whether or not the vehicle speed is higher than or equal to second threshold speed W and the steer angle of front road wheels 27, 27 is smaller than or equal to second threshold angle Z. When the answer to step S4 is YES, the routine proceeds to step S5. On the other hand, when the answer to step S4 is NO, the routine proceeds to step S7. At step S5, first controller 4a disengages electromagnetic clutch 14. Subsequent to step S5, at step S6, first controller 4a performs the SBW mode control. Subsequent to step S6, the routine returns. At step S7, first controller 4a holds electromagnetic clutch 14 engaged. Subsequent to step S7, at step S8, first controller 4a determines whether or not the ignition switch is OFF. When the answer to step S8 is YES, the routine returns. On the other hand, when the answer to step S8 is NO, the routine proceeds to step S3.

When front road wheels 27, 27 are turned toward the maximum steer angle under a condition in which the vehicle speed is extremely low, first controller 4a executes a sequence of steps S0, S1, S2, S3, and S4 as shown in FIG. 7. Subsequently, first controller 4a repeatedly executes a sequence of steps S7, S8, S3, and S4, until it is determined at step S4 that the state of the vehicle changes to be in a condition in which the vehicle speed is higher than or equal to second threshold speed W and the steer angle of front road wheels 27, 27 is smaller than or equal to second threshold angle Z. Thus, under a condition in which the steer angle is at or near the maximum steer angle, first controller 4a engages electromagnetic clutch 14 to mechanically connect steering wheel 9 and steering rack assembly 28, and performs the PS mode control by operating steering motors 29, 30.

In accordance with the above-mentioned control, when the vehicle speed is extremely low, i.e. at or near zero, and the steer angle is large, i.e. at or near the maximum, the driver steering effort serves for generating part of the required effort for movement of steering rack assembly 28 in the PS mode. Therefore, the loads of steering motors 29, 30 are much smaller than in a case in which a typical steering apparatus performs an SBW control over the whole range of the steer angle. Steering motors 29, 30 employed in the steering apparatus may be downsized and configured to have a relatively small capacity. With steering wheel 9 being mechanically connected to steering rack assembly 28, the reaction force is input or fed back to steering wheel 9 in accordance with the steer angle. This gives an adequate amount of the feedback steering effort without operating feedback motor 5. Therefore, feedback motor 5 may be also downsized and configured to have a small capacity.

When it is determined at step S4 that the state of the vehicle changes to be in a condition in which the vehicle speed is higher than or equal to second threshold speed W and the steer angle of front road wheels 27, 27 is smaller than or equal to second threshold angle Z, first controller 4a executes a sequence of steps S4, S5, and S6. Specifically, first controller 4a disengages electromagnetic clutch 14, and switches the control mode from the PS mode to the SBW mode. When the state of the vehicle is out of the condition in which the vehicle speed is extremely low, i.e. at or near zero, and the steer angle is large, i.e. at or near the maximum, the load required to move steering rack assembly 28 is small. Accordingly, when the SBW mode is initialized, the outputs of steering motors 29, 30 are held small.

The difference between the switch point from the PS mode to the SBW mode and the switch point from the SBW mode to the PS mode serves as a hysteresis to prevent undue frequent repetitions of the control mode switch. Accordingly, it prevents that electromagnetic clutch 14 is frequently engaged and disengaged to generate vibration and noise when the state of the vehicle varies around the condition in which the vehicle speed is extremely low and the steer angle is large.

When the vehicle speed is higher than first threshold speed X or the steer angle of front road wheels 27, 27 is smaller than first threshold angle Y, first controller 4a repeatedly executes a sequence of steps S0, S1, S5, and S6. Thus first controller 4a continues to perform the SBW mode control. If electromagnetic clutch 14 were engaged when the vehicle is traveling through a hollow on a road so that the steer angle rapidly varies, large kickback would be transmitted to steering wheel 9, which would adversely affect the drivability of the vehicle. In the first embodiment, while the vehicle is traveling at normal speeds, the steering apparatus continues to perform the SBW mode control with electromagnetic clutch 14 being disengaged, without adversely affecting the drivability of the vehicle.

Figure 8:
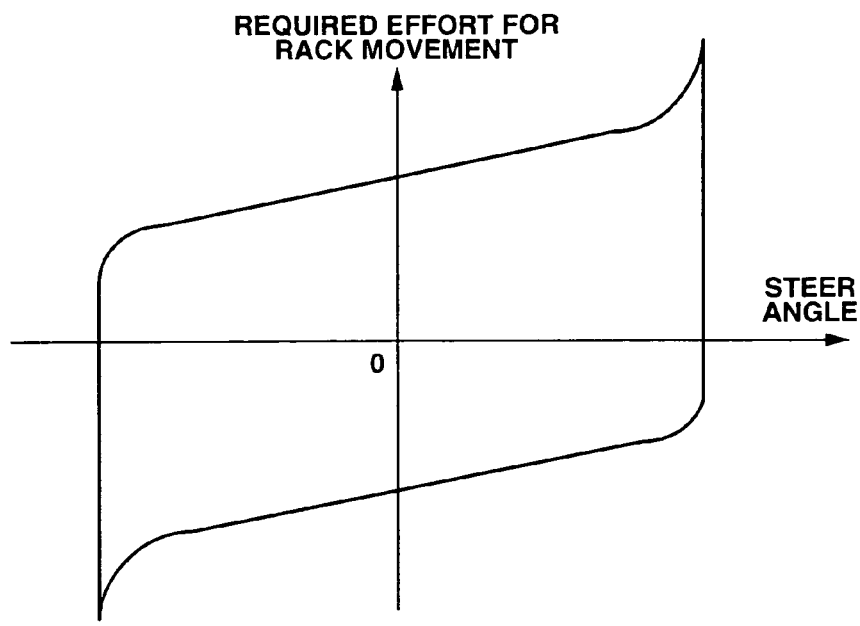
FIG. 8 is a diagram depicting how a required effort for movement of a steering rack of a typical rack-and-pinion steering device varies with respect to its steer angle.
Figure 9:
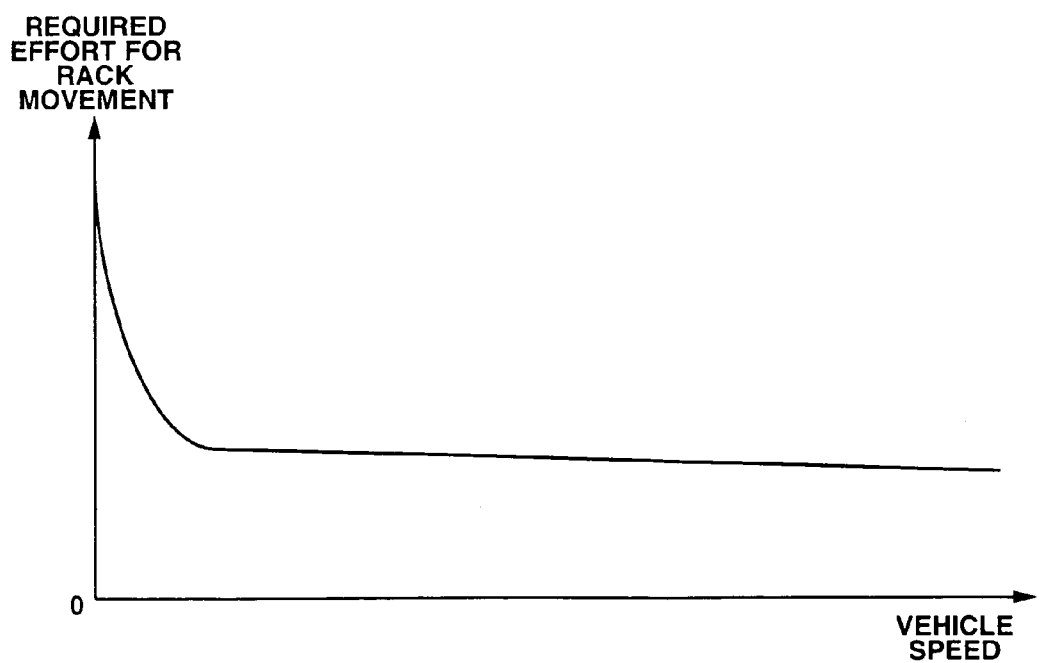
FIG. 9 is a diagram depicting how a required effort for movement of a steering rack of a typical rack-and-pinion steering device varies with respect to a vehicle speed of a vehicle equipped with the steering device.

In general, a required effort for movement of the steering rack (a required rack thrust, or a rack load) shows characteristics as shown in FIG. 8 when the vehicle speed is at or near zero. The characteristics as shown in FIG. 8 is due to a suspension geometry, and to a friction between tires and a road surface. As shown in FIG. 8, the required effort for movement of the steering rack increases with an increase in the steer angle. In addition, the required effort for movement of the steering rack increases with a decrease in the vehicle speed, as shown in FIG. 9. The rate of change of the required effort for movement of the steering rack is large in a region in which the vehicle speed is at or near zero. As a matter of course, these characteristics are provided to a driver in a manual steering system with no power assist. Thus, the required effort for movement of the steering rack is large in a region in which the vehicle speed is extremely low and the steer angle is large. If the SBW mode control were performed in the region, the steering motor would need to be a motor having a large capacity. In addition, a high load of the steering motor in the region results in an increase in the power supply and thereby an increase in the temperature of the steering motor. If the load of the steering motor were limited in order to reduce the temperature increase, it would be possible that the steer angle cannot reach the maximum angle.

The above-mentioned problem is solved by means of the steering apparatus in accordance with the first embodiment, which performs the PS mode control by engaging electromagnetic clutch 14 and operating steering motors 29, 30 in the region in which the vehicle speed is lower than or equal to first threshold speed X and the steer angle is larger than first threshold angle Y. In the PS mode, with steering wheel 9 being mechanically connected to steering rack assembly 28, the steering apparatus operates steering motors 29, 30 to boost the manual steering effort. Accordingly, even when the steer angle is at or near the maximum steer angle, the apparatus is effective for reducing an increase in the electric consumption and the temperature of steering motors 29, 30.

Therefore steering motors 29, 30 of a small capacity is capable of steering front road wheels 27, 27 to the maximum steer angle.

Suppose the vehicle turns on a bad road with the steering wheel fully turned under a condition in which the measured vehicle speed from vehicle speed sensor 50 is lower than first threshold speed X. In such a situation, even when a driver intends to hold steering wheel 9, steering wheel 9 is applied to with a feedback torque caused by road reaction so that the angle of steering wheel 9 fluctuates. If electromagnetic clutch 14 were repeatedly engaged and disengaged in accordance with the fluctuations in the steering wheel angle, that operation would generate vibration and noise to adversely affect the drivability of the vehicle. In addition, with electromagnetic clutch 14 engaged under a condition in which the steer angle at or near the maximum steer angle, the feedback torque rapidly increases so that the driver feels shock.

In contrast with the above hypothetical example, the steering apparatus in accordance with the first embodiment is configured to switch the control mode from the SBW mode to the PS mode when the state of the vehicle changes to be in a condition in which the vehicle speed is lower than or equal to first threshold speed X and the steer angle of front road wheels 27, 27 is larger than or equal to second threshold speed W, and to switch the control mode from the PS mode to the SBW mode when the state of the vehicle changes to be in a condition in which the vehicle speed is higher than or equal to second threshold speed W higher than first threshold speed X and the steer angle of front road wheels 27, 27 is smaller than or equal to second threshold angle Z smaller than second threshold speed W. That is, the transition between the PS mode and the SBW mode is given a hysteresis, preventing electromagnetic clutch 14 from being repeatedly engaged and disengaged, and reducing noise and vibration in the state change of electromagnetic clutch 14. In addition, the steering apparatus is effective for preventing undue frequent repetitions of switch of the state of electromagnetic clutch 14 when the road wheels slips to temporarily increase the measured vehicle speed with errors.

The following describes effects produced by the steering apparatus in accordance with the first embodiment. (Ef1) A steering apparatus for a steerable vehicle, including: a steering unit (3) configured to generate an assist steering effort to regulate a steer angle of the vehicle; an operating unit (9) configured to receive a manual steering effort; a backup unit (2) configured selectively to mechanically connect the steering unit (3) and the operating unit (1, 9), and to mechanically separate the steering unit (3) from the operating unit (1, 9); and a control unit (4) connected electrically for signal communication to the steering unit (3), the operating unit (9), and the backup unit (2), and operable in at least two control modes including an SBW mode and a PS mode, the control unit (4) being configured to perform the following in the SBW mode: mechanically separating the steering unit (3) from the operating unit (1, 9); controlling the steer angle in accordance with the manual steering effort; and switching the control mode from the SBW mode to the PS mode when an SBW-to-PS mode switch condition is satisfied, the SBW-to-PS mode switch condition including a condition that the steer angle is larger than or equal to a first threshold angle (Y), and the control unit (4) being configured to perform the following in the PS mode: mechanically connecting the steering unit (3) and the operating unit (1, 9); controlling the assist steering effort to boost the manual steering effort; and switching the control mode from the PS mode to the SBW mode when a PS-to-SBW mode switch condition is satisfied, the PS-to-SBW mode switch condition including a condition that the steer angle is smaller than or equal to a second threshold angle (Z), is effective for reducing the loads of steering motors 29, 30 in a region in which the steer angle is at or near the maximum steer angle, and thereby effective for downsizing steering motors 29, 30.

(Ef2) The steering apparatus wherein the control unit (4) is configured to set the first threshold angle (Y) so that the first threshold angle (Y) decreases with a decrease in a speed of the vehicle, is effective for further reducing the loads of steering motors 29, 30, and thereby effective for downsizing steering motors 29, 30, because the required effort for movement of the steering rack increases with a decrease in the vehicle speed.

(Ef3) The steering apparatus wherein the second threshold angle (Z) is set to be smaller than the first threshold angle (Y), is effective for preventing undue frequent repetitions of the control mode switch in which electromagnetic clutch 14 is repeatedly engaged and disengaged to adversely affect the drivability of the vehicle, in case the steer angle varies around first threshold angle Y.

(Ef4) The steering apparatus wherein the SBW-to-PS mode switch condition includes a condition that a speed of the vehicle is lower than or equal to a first threshold speed, and wherein the PS-to-SBW mode switch condition includes a condition that the vehicle speed is higher than or equal to a second threshold speed (W), is effective for reducing the loads of steering motors 29, 30 in a region in which the vehicle speed is at or near zero so that the required effort for movement of the steering rack is large, and effective for preventing that when the vehicle is traveling through a hollow on a road so that the steer angle instantaneously varies, large kickback is transmitted to steering wheel 9, which adversely affects the drivability of the vehicle.

(Ef5) The steering apparatus wherein the second threshold speed (W) is set to be larger than the first threshold speed (X), is effective for preventing undue frequent repetitions of the control mode switch in which electromagnetic clutch 14 is repeatedly engaged and disengaged to adversely affect the drivability of the vehicle, in case the vehicle speed varies around first threshold speed X.

Figure 10:
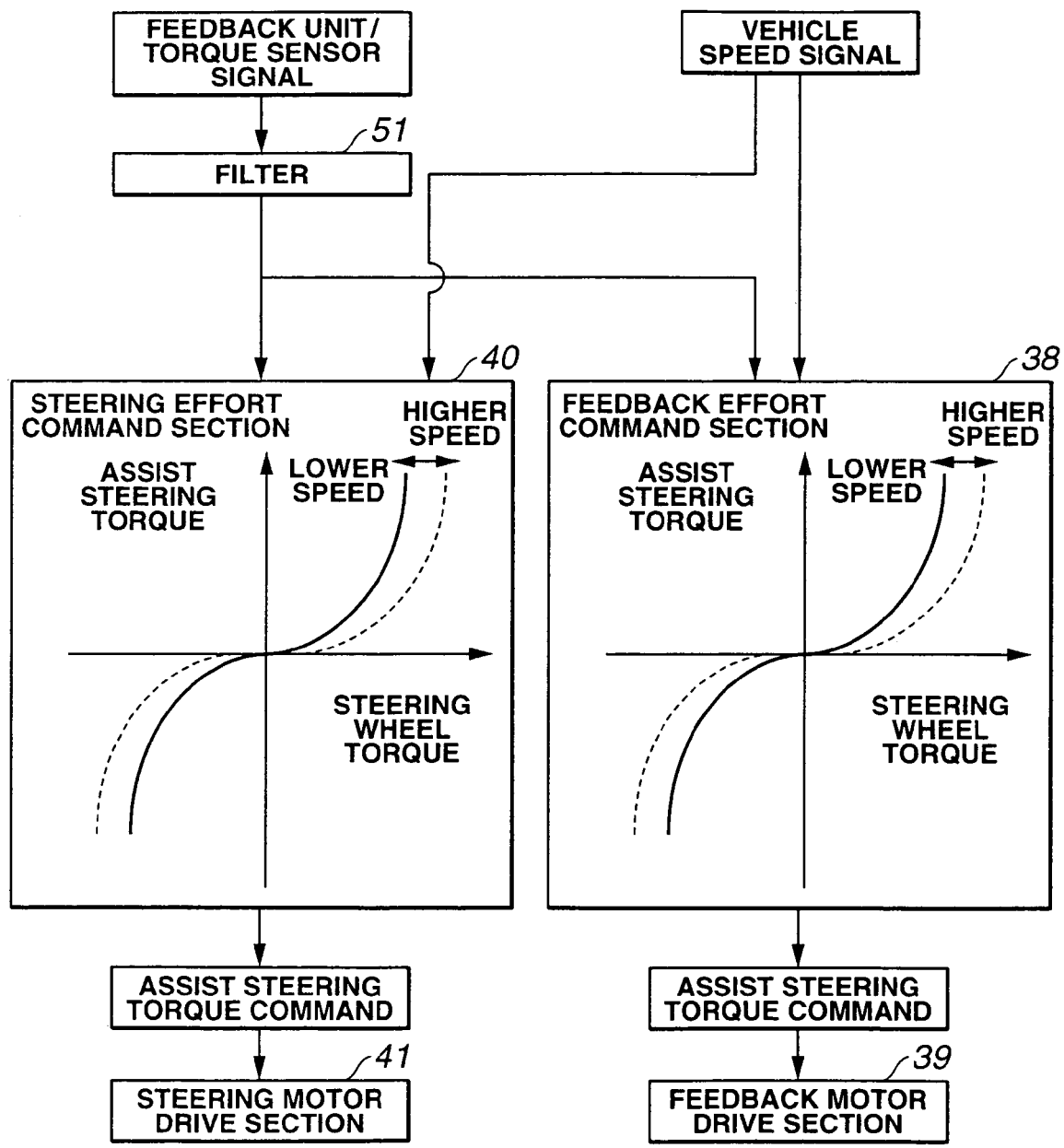
FIG. 10 is a system block diagram depicting how, in a control system of a steering apparatus for a steerable vehicle in accordance with a second embodiment of the present invention, a steering effort command section 40 and a feedback torque command section 38 operate in a PS mode.

Referring now to FIG. 10, there is shown a steering apparatus for a steerable vehicle in accordance with a second embodiment of the present invention. The steering apparatus in accordance with the second embodiment is constructed as in the first embodiment except features as below mentioned. FIG. 10 is a system block diagram depicting how steering effort command section 40 and feedback torque command section 38 operate in the PS mode.

Feedback effort command section 38 is configured to receive a vehicle speed signal from vehicle speed sensor 50 and a steering torque signal from torque sensor 7 through a filter 51. Feedback effort command section 38 is configured to determine the assist steering effort to be generated by feedback motor 5 in accordance with the vehicle speed signal and the steering torque signal using a map as shown in FIG. 10, and to output to feedback motor drive section 39. The map is designed as for steering effort command section 40 so that the assist steering torque increases with an increase in the steering wheel torque and decreases with an increase in the vehicle speed. The assist steering torque is shared between steering motors 29, 30 and feedback motor 5. The assist steering torque of steering motors 29, 30 is set to be half the torque of the first embodiment, which has the same characteristics as feedback motor 5.

In the second embodiment, the steering apparatus produces the following effect (Ef6) in addition to the effects (Ef1) through (Ef5) as mentioned above in the first embodiment. (Ef6) The steering apparatus including a feedback unit (1) configured to generate a feedback effort applied to the operating unit (9), wherein the control unit (4) is connected electrically for signal communication to the feedback unit (1), and configured to control both of the feedback effort and the assist steering effort to boost the manual steering effort in the PS mode, is effective for reducing the loads of steering motors 29, 30, and thereby effective for downsizing steering motors 29, 30.

Referring now to FIGS. 11 through 14, there is shown a steering apparatus for a steerable vehicle in accordance with a third embodiment of the present invention. In the third embodiment, the steering apparatus includes a variable-ratio rack-and-pinion device for variable ratio steering, that is, for varying the steering ratio which is the ratio of the steering wheel angle to the steer angle of the steerable front road wheels, so that the steering ratio in the PS mode is substantially equal to or comparable to the steering ratio in the SBW mode when the control mode is switched between the PS mode and the SBW mode.

Figure 11:
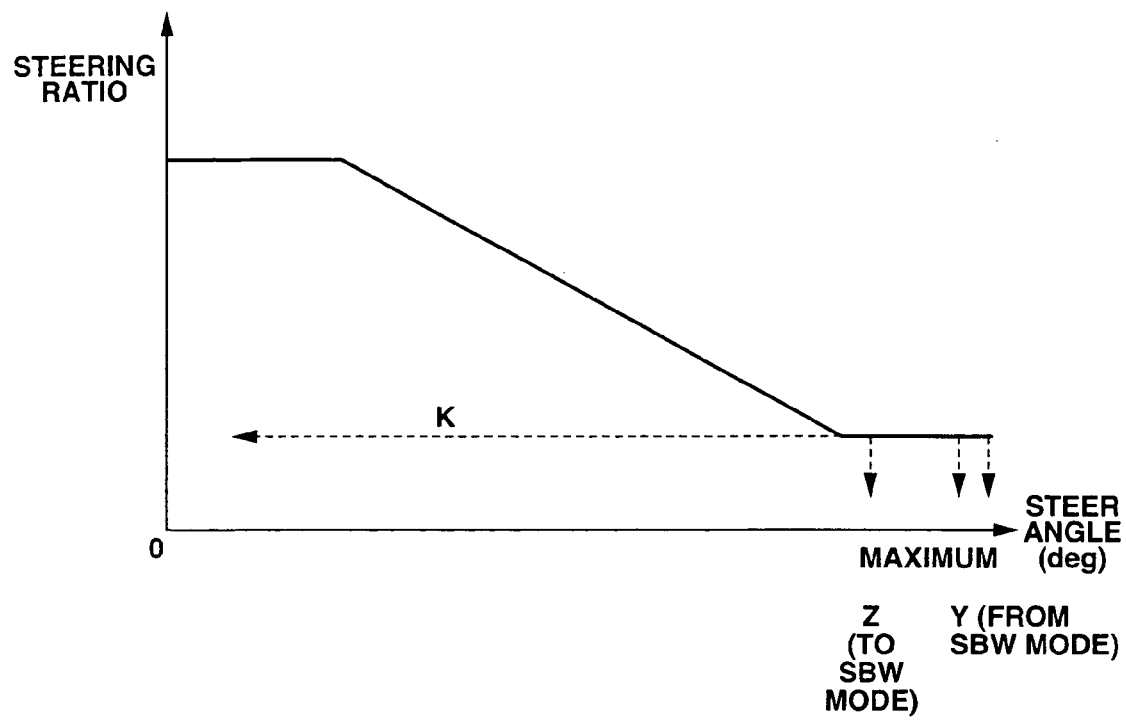
FIG. 11 is a diagram depicting how, in a steering apparatus for a steerable vehicle in accordance with a third embodiment of the present invention, its steering ratio varies with respect to its steer angle in a PS mode.

FIG. 11 is a diagram depicting how the steering ratio varies with respect to the steer angle in the PS mode in accordance with the third embodiment. The variable-ratio rack-and-pinion device is designed so that the rack pitch, i.e. the pitch of teeth of the steering rack is small for steer angles around the neutral position of steering wheel 9, is large for steer angles at or near the maximum steer angle, and decreases with an increase in the steer angle for other steer angles between the neutral point and the maximum steer angle. Accordingly, as shown in FIG. 11, the steering ratio is high with respect to steer angles around the steering neutral position so that the steering response is quick, and is low with respect to steer angles at or near the maximum steer angle so that the steering response is slow. The steering ratio is set to be the minimum value (minimum steering ratio setting) K in the region in which the steer angle is at or near the maximum steer angle and which includes first threshold angle Y and second threshold angle Z.

Figure 12:
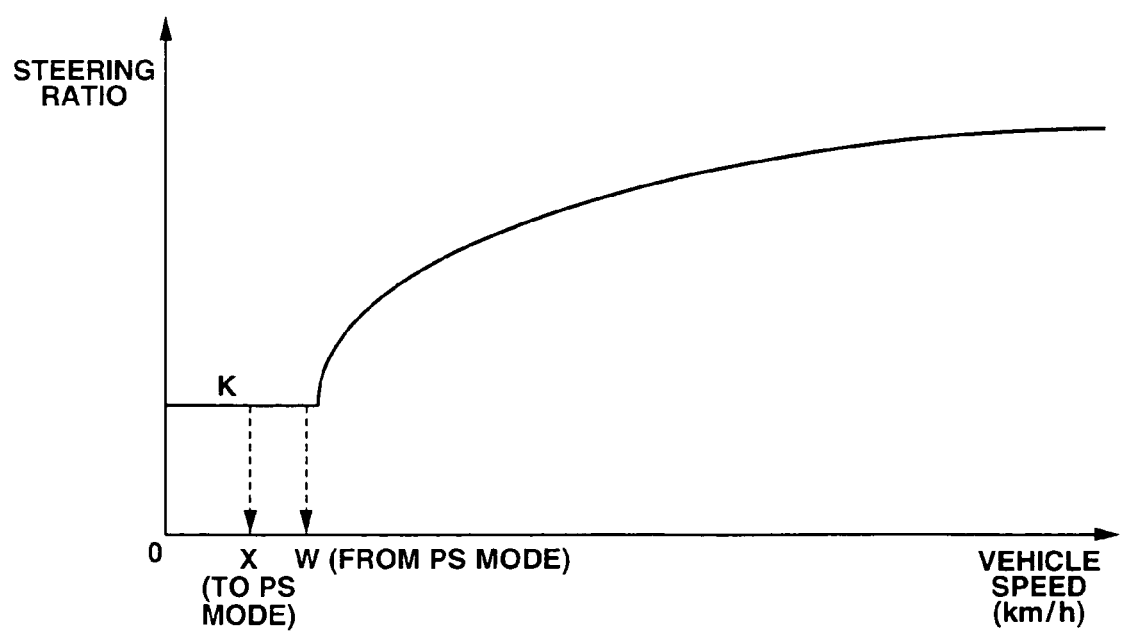
FIG. 12 is a diagram depicting how the steering ratio varies with respect to a vehicle speed of the vehicle in an SBW mode in the steering apparatus in accordance with the third embodiment.

FIG. 12 is a diagram depicting how the steering ratio varies with respect to the vehicle speed in the SBW mode in accordance with the third embodiment. As shown in FIG. 12, in the SBW mode, the steering ratio increases with an increase in the vehicle speed, and is set to be the minimum value K in a region in which the vehicle speed is at or near zero and which includes first threshold speed X and second threshold speed W.

Figure 13:
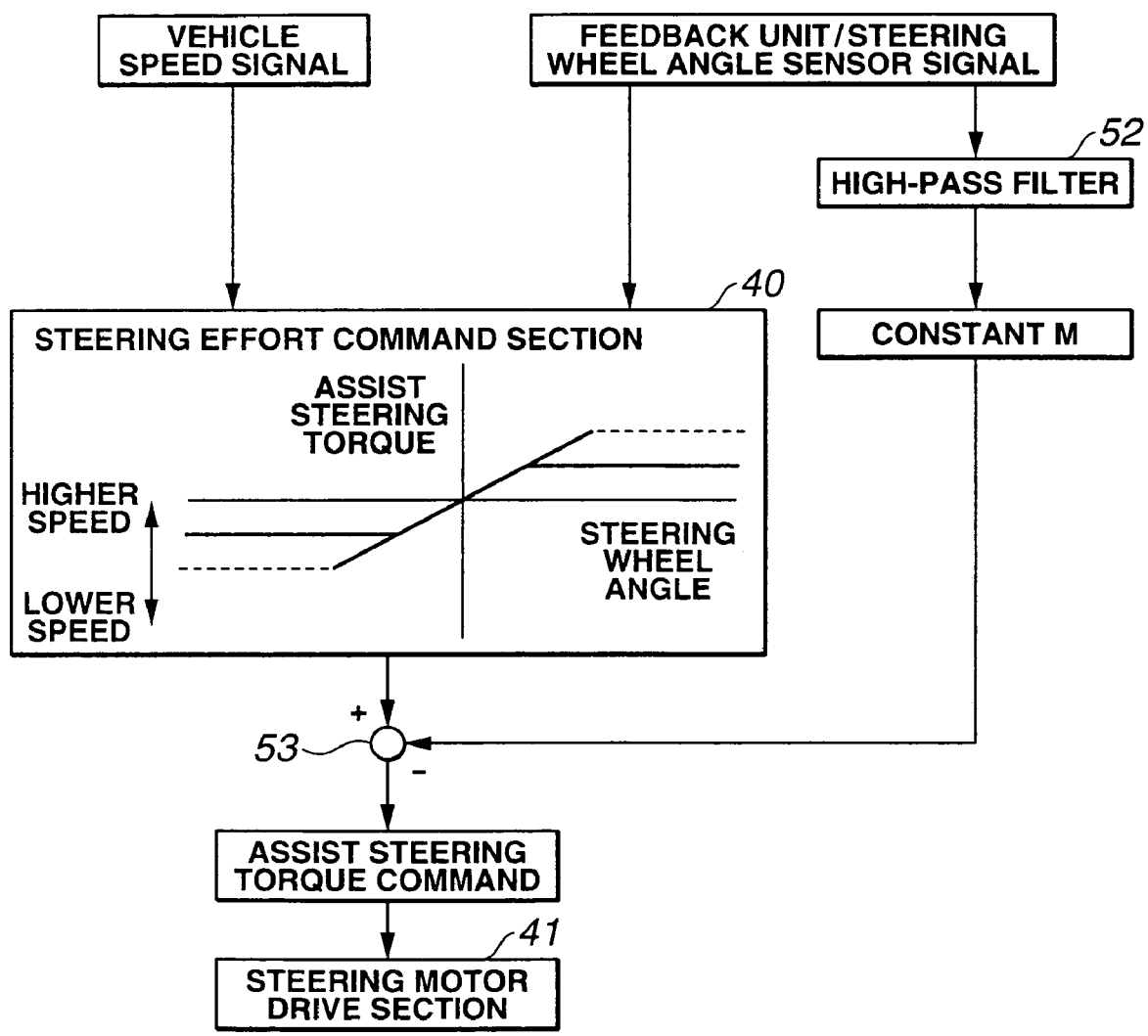
FIG. 13 is a system block diagram depicting how a steering effort command section 40 operates in a PS mode in a control system of the steering apparatus in accordance with the third embodiment.

FIG. 13 is a system block diagram depicting how steering effort command section 40 operates in the PS mode in accordance with the third embodiment. Steering effort command section 40 is configured to receive signals from vehicle speed sensor 50 and steering wheel angle sensors 6a, 6b of feedback unit 1. Steering effort command section 40 is configured to determine the assist steering effort to be generated by steering unit 3 in accordance with the vehicle speed signal and the steering torque signal using a map as shown in block 40 in FIG. 13, and to output to a subtracter 53. The map is designed so that the assist steering torque increases with an increase in the steering wheel angle and decreases with an increase in the vehicle speed. The assist steering torque is set to be constant with respect to steer angles above a predetermined value, preventing steering wheel 9 from excessively turning, and preventing steering motors 29, 30 from being overheated. Passing through a high-pass filter 52, the steering wheel angle signal is multiplied by a predetermined constant M to produce a negative gain, and is input to subtracter 53. Subtracter 53 is configured to calculate the assist steering torque by subtracting the negative gain from the value derived from the map. When the steering wheel angle is large, the assist steering toque command is adjusted by subtracting the negative gain. The steering apparatus thus configured to control the assist steering effort in the PS mode so that the assist steering effort is added with a negative feedback proportional to the steer angle in a region in which the steer angle is relatively large, is effective for preventing the assist steering torque command from excessively increasing. Finally, the assist steering torque command is input to steering motor drive section 41.

Figure 14:
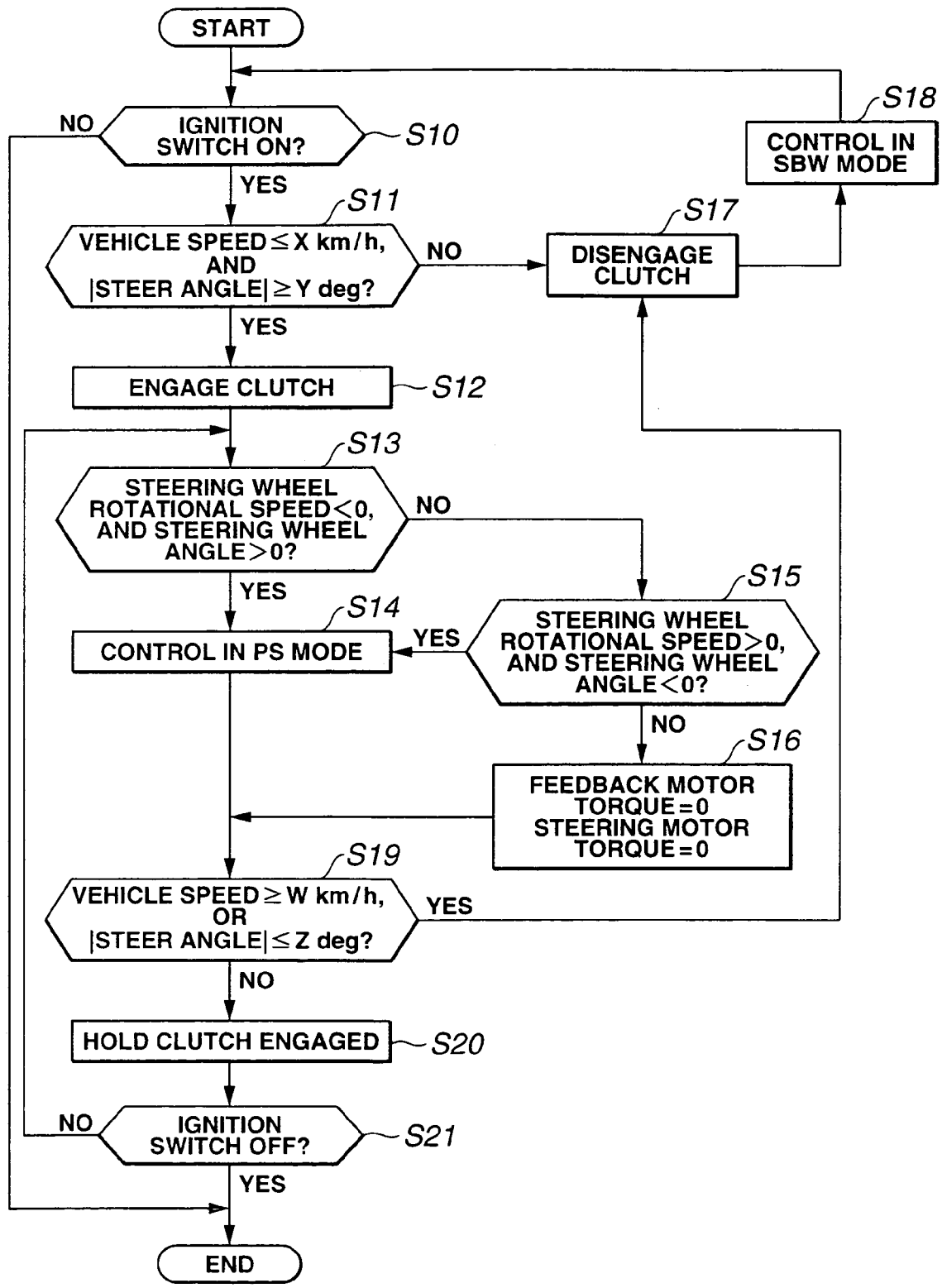
FIG. 14 is a flow chart depicting a routine executed by a first controller 4a employed in the steering apparatus in accordance with the third embodiment.

The following describes operations and behaviors of the steering apparatus in accordance with the third embodiment. FIG. 14 is a flow chart depicting a routine executed by first controller 4a. Steps S10, S12, S14, and S17 through S21 are same as steps S0 through S2, S3, and S5 through S8 in the first embodiment, respectively. In contrast to the first embodiment, at step S13, first controller 4a determines whether or not the rotational speed (angular speed) of steering wheel 9 is smaller than zero and the steering wheel angle is larger than zero (positive clockwise). When the answer to step S13 is YES, the routine proceeds to step S14. On the other hand, when the answer to step S13 is NO, the routine proceeds to step S15. At step S15, first controller 4a determines whether or not the rotational speed of steering wheel 9 is larger than zero and the steering wheel angle is smaller than zero (positive clockwise). When the answer to step S15 is YES, the routine proceeds to step S14. On the other hand, when the answer to step S13 is NO, the routine proceeds to step S16. At step S16, first controller 4a controls the outputs of feedback motor 5 and steering motors 29, 30 to zero. Subsequent to step S16, the routine proceeds to step S19.

When the steering wheel is controlled toward the neutral point under the condition in which the vehicle speed is at or zero and the steer angle of front road wheels 27, 27 is at or near the maximum steer angle, first controller 4a executes a sequence of steps S10, S11, and S12 at which electromagnetic clutch 14 is engaged. The engagement of electromagnetic clutch 14 is smooth because the steering ratio in the PS mode that the steer angle is first threshold angle Y is the minimum value K which is same in the SBW mode. With the steering ratio being the minimum value K, steering wheel 9 is input to with a large feedback torque without overloading steering motors 29, 30.

Subsequent to step S12, first controller 4a executes a sequence of steps S13, S14, S19, S20, and S21 during steering wheel 9 rotating counterclockwise toward the neutral point, or a sequence of steps S10, S11, S12, S13, S15, S14, 519, S20, and S21 during steering wheel 9 rotating clockwise toward the neutral position. First controller 4a repeatedly executes the sequence of steps S13, S14, S19, S20, and S21, or the sequence of steps S10, S11, S12, S13, S15, S14, S19, S20, and S21, until the state of the vehicle varies to be in a condition in which the vehicle speed is larger than or equal to second threshold speed W and the steer angle is smaller than or equal to second threshold angle Z. Thus, first controller 4a performs the PS mode control by means of steering motors 29, 30.

When the steer angle is reduced to be smaller than or equal to second threshold angle Z by steering back to the neutral point, first controller 4a executes a sequence of steps S19, S17, and S18, in which electromagnetic clutch 14 is disengaged to switch the control mode from the PS mode to the SBW mode. Just before the mode transition, the steering ratio is the minimum value K with the steer angle being second threshold angle Z. Just after the mode transition, the steering ratio is also the minimum value K with the steer angle being second threshold angle Z. Accordingly, the steering ratio is unchanged through the transition from the PS mode to the SBW mode, providing smooth handling.

On the other hand, when the angle of steering wheel 9 is held or increasing from the neutral point under the condition in which the vehicle speed is extremely low and the steer angle is at or near the maximum steer angle, control unit 4 executes a sequence of steps S10, S11, S12, S13, S15, S16, S19, S20, and S21. At step S16, the outputs of steering motors 29, 30 and feedback motor 5 are set to zero. In this manner, when steering wheel 9 is turned back toward the neutral position, the driver steering wheel torque is boosted to assist steering wheel 9 to rotate back to the neutral position. On the other hand, when steering wheel 9 is turned away from the neutral position, the assist steering torque is set to zero so that feedback torque is generated without loading steering motors 29, 30.

In general, a typical SBW apparatus is configured to control the steering ratio so that the steering ratio in the SBW mode is low in order to provide quick steering response under the condition in which the vehicle speed is low. If the steering apparatus employs a rack and pinion steering device whose steering ratio is fixed, its fixed steering ratio is needed to be a low value to provide smooth mode transition. With this arrangement, when the vehicle is traveling at high speed, the low steering ratio adversely affects the vehicle stability. Conversely, with a fixed high steering ratio employed to enhance the vehicle stability, the gap of the steering ratio in the mode transition is large so that a driver may feel uncomfortable.

In the third embodiment, the steering apparatus includes a variable-ratio rack-and-pinion device whose rack pitch is designed so that the steering ratio in the SBW mode is same as in the PS mode under the condition in which the vehicle speed is at or near zero, to solve the above-mentioned problem. Accordingly, the steering ratio around the neutral point is high, and is relatively low in the region in which the steer angle is at or near the maximum steer angle. With the low steering ratio, steering wheel 9 is input to with a large reaction torque is obtained without overloading steering motors 29, 30.

In the third embodiment, the steering apparatus produces the following effects (Ef7) and (Ef8) in addition to the effects (Ef1) through (Ef5) as mentioned above in the first embodiment. (Ef7) The steering apparatus wherein the control unit (4) is configured to control a steering ratio in the SBW mode so that the steering ratio is substantially equal to a steering ratio in the PS mode in transition between the SBW mode and the PS mode, is effective for providing smooth steering feel without an undesirable change in the steering ratio in the transition between the PS mode and the SBW mode. (Ef8) The steering apparatus wherein the control unit (4) is configured to boost the manual steering effort when the steer angle decreases in the PS mode, and to set the assist steering effort to zero when the steer angle is held constant or increases in the PS mode, is effective for enhancing the static stability of steering wheel 9.

Although the invention has been described above by reference to the shown embodiments of the invention, the invention is not limited to the embodiments described above. The steering apparatus in accordance with the shown embodiments may be modified as follows.

In the shown embodiments, the steering apparatus includes two steering motors 29, 30 constantly serving for generating the steering torque. However, the steering apparatus may employ first steering motor 29 as a main motor under normal conditions, and second steering motor 30 as an auxiliary motor only under abnormal conditions in which the main motor fails to normally operate.

In the shown embodiments, the angular positions of steering motors 29, 30 and feedback motor 5 are measured by the rotary encoders. However, it is optional to employ resolvers for measuring the angular positions.

In the shown embodiments, backup unit 2 employs a cable-type steering device. However, backup unit 2 may employ a shaft-type steering device. Electromagnetic clutch 14 may be normally engaged and be disengaged during being energized. This arrangement is effective for enhancing the safety of the steering apparatus because even when electric power is not supplied to electromagnetic clutch 14 or control unit 4, electromagnetic clutch 14 is engaged to connect steering wheel 9 and steering rack assembly 28.

In the third embodiment, the steering apparatus includes the variable-ratio rack-and-pinion device in order to vary the steering ratio in the PS mode. However, the steering apparatus may include a variable steering gear actuator such as a motor to vary the steering ratio.

This application is based on a prior Japanese Patent Application No. 2004-180014 filed on Jun. 17, 2004. The entire contents of this Japanese Patent Application No. 2004-180014 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A steering apparatus for a steerable vehicle, comprising:
   a steering unit configured to generate an assist steering effort to regulate a steer angle of the vehicle;
   an operating unit configured to receive a manual steering effort;
   a backup unit configured selectively to mechanically connect the steering unit and the operating unit, and to mechanically separate the steering unit from the operating unit; and
   a control unit connected electrically for signal communication to the steering unit, the operating unit, and the backup unit, and operable in at least two control modes including an SBW mode and a PS mode,
   the control unit being configured when in the SBW mode to:
   mechanically separate the steering unit from the operating unit;
   control the steer angle in accordance with the manual steering effort;
   determine whether or not an SBW-to-PS mode switch condition is satisfied, the SBW-to-PS mode switch condition being a condition that the steer angle is larger than or equal to a first threshold angle; and
   switch the control mode from the SBW mode to the PS mode when it is determined that the SBW-to-PS mode switch condition is satisfied, and
   the control unit being configured when in the SBW mode to:
   mechanically connect the steering unit and the operating unit;
   control the assist steering effort to boost the manual steering effort;

determine whether or not a PS-to-SBW mode switch condition is satisfied, the PS-to-SBW mode switch condition being a condition that the steer angle is smaller than or equal to a second threshold angle; and switch the control mode from the PS mode to the SBW mode when it is determined that the PS-to-SBW mode switch condition is satisfied.

2. The steering apparatus as claimed in claim 1, wherein the control unit is configured to set the first threshold angle so that the first threshold angle decreases with a decrease in a speed of the vehicle.

3. The steering apparatus as claimed in claim 1, wherein the second threshold angle is set to be smaller than the first threshold angle.

4. A steering apparatus for a steerable vehicle, comprising:
   a steering unit configured to generate an assist steering effort to regulate a steer angle of the vehicle;
   an operating unit configured to receive a manual steering effort;
   a backup unit configured selectively to mechanically connect the steering unit and the operating unit, and to mechanically separate the steering unit from the operating unit; and
   a control unit connected electrically for signal communication to the steering unit, the operating unit, and the backup unit, and operable in at least two control modes including an SBW mode and a PS mode,
   the control unit being configured when in the SBW mode to:
   determine whether or not a second SBW-to-PA mode switch condition is satisfied, the second SBW-to-PS mode switch condition being a condition that a speed of the vehicle is lower than or equal to a first threshold speed; and
   switch the control mode from the SBW mode to the PS mode when it is determined that the second SBW-to-PS mode switch condition is satisfied, and
   the control unit being configured when in the PS mode to:
   determine whether or not a second PS-to-SBW mode switch condition is satisfied, the second PS-to-SBW mode switch condition being a condition that the vehicle speed is higher than or equal to a second threshold speed; and
   switch the control mode from the PS mode to the SBW mode when it is determined that the second PS-to-SBW mode switch condition is satisfied.

5. The steering apparatus as claimed in claim 4, wherein the second threshold speed is set to be larger than the first threshold speed.

6. The steering apparatus as claimed in claim 1, further comprising a feedback unit configured to generate a feedback effort applied to the operating unit, wherein the control unit is connected electrically for signal communication to the feedback unit, and configured to control both of the feedback effort and the assist steering effort to boost the manual steering effort in the PS mode.

7. The steering apparatus as claimed in claim 6, wherein the controlled feedback effort is substantially equal to the controlled steering effort in the PS mode.

8. The steering apparatus as claimed in claim 1, wherein the control unit is configured to control a steering ratio in the SBW mode so that the steering ratio is substantially equal to a steering ratio in the PS mode in transition between the SBW mode and the PS mode.

9. The steering apparatus as claimed in claim 8, wherein the steering unit is configured so that the steering ratio in the PS mode decreases with an increase in the steer angle, and is constant with respect to the steer angle in a region of transition between the SBW mode and the PS mode.

10. The steering apparatus as claimed in claim 8, wherein the control unit is configured to control the steering ratio in the SBW mode so that the steering ratio in the SBW mode is constant with respect to a speed of the vehicle in a region of transition between the SBW mode and the PS mode, and increases with an increase in the vehicle speed.

11. The steering apparatus as claimed in claim 8, wherein the control unit is configured to boost the manual steering effort when the steer angle decreases in the PS mode.

12. The steering apparatus as claimed in claim 11, wherein the control unit is configured to set the assist steering effort to zero when the steer angle is held constant or increases in the PS mode.

13. The steering apparatus as claimed in claim 1, wherein the control unit is configured to control the assist steering effort in the PS mode so that the assist steering effort increases with an increase in the steer angle, increases with a decrease in a speed of the vehicle, and is constant with respect to the steer angle in a region in which the steer angle is relatively large.

14. The steering apparatus as claimed in claim 1, wherein the control unit is configured to control the assist steering effort in the PS mode so that the assist steering effort increases with an increase in the steer angle, and is added with a negative feedback proportional to the steer angle in a region in which the steer angle is relatively large.

15. A steering apparatus for a steerable vehicle, comprising:
   a steering unit configured to generate an assist steering effort to regulate a steer angle of the vehicle;
   an operating unit configured to receive a manual steering effort;
   a backup unit configured selectively to mechanically connect the steering unit and the operating unit, and to mechanically separate the steering unit from the operating unit; and
   a control unit connected electrically for signal communication to the steering unit, the operating unit, and the backup unit, the control unit being configured to:
   determine whether a steering effort required to control the steer angle is relatively small or relatively large;
   control the steer angle in accordance with the manual steering effort, with the backup unit mechanically separating the steering unit from the operating unit, when it is determined that the required steering effort is relatively small; and
   control the assist steering effort to boost the manual steering effort, with the backup unit mechanically connecting the steering unit and the operating unit, when it is determined that the required steering effort is relatively large.

16. A steering apparatus for a steerable vehicle, comprising:
   steering means for generating an assist steering effort to regulate a steer angle of the vehicle;
   operating means for receiving a manual steering effort;
   backup means for selectively mechanically connecting the steering means and the operating means, and mechanically separating the steering means from the operating means; and
   control means for being operable in at least two control modes including an SBW mode and a PS mode,
   for performing the following in the SBW mode:

mechanically separating the steering unit from the operating means;

controlling the steer angle in accordance with the manual steering effort;

determining whether or not an SBW-to-PS mode switch condition is satisfied, the SBW-to-PS mode switch condition being a condition that the steer angle is larger than or equal to a first threshold angle; and switching the control mode from the SBW mode to the PS mode when it is determined that the SBW-to-PS mode switch condition is satisfied, and for performing the following in the PS mode:

mechanically connecting the steering means and the operating means;

controlling the assist steering effort to boost the manual steering effort; and determining whether or not a PS-to-SBW mode switch condition is satisfied, the PS-to-SBW mode switch condition being a condition that the steer angle is smaller than or equal to a second threshold angle; and switching the control mode from the PS mode to the SBW mode when it is determined that the PS-to-SBW mode switch condition is satisfied.

17. A method of controlling a steering apparatus for a steerable vehicle, the steering apparatus including a steering unit configured to generate an assist steering effort to regulate a steer angle of the vehicle, an operating unit configured to receive a manual steering effort, and a backup unit configured selectively to mechanically connect the steering unit and the operating unit, and to mechanically separate the steering unit from the operating unit, the method comprising:

operating in at least two control modes including an SBW mode and a PS mode;

performing the following in the SBW mode:

mechanically separating the steering unit from the operating unit;

controlling the steer angle in accordance with the manual steering effort;

determining whether or not an SBW-to-PS mode switch condition is satisfied, the SBW-to-PS mode switch condition being a condition that the steer angle is larger than or equal to a first threshold angle; and switching the control mode from the SBW mode to the PS mode when it is determined that the SBW-to-PS mode switch condition is satisfied, and performing the following in the PS mode:

mechanically connecting the steering unit and the operating unit;

controlling the assist steering effort to boost the manual steering effort;

determining whether or not a PS-to-SBW mode switch condition is satisfied, the PS-to-SBW mode switch condition being a condition that the steer angle is smaller than or equal to a second threshold angle; and switching the control mode from the PS mode to the SBW mode when it is determined that the PS-to-SBW mode switch condition is satisfied.

18. The steering apparatus as claimed in claim 1, wherein the control unit is configured to perform the following in the SBW mode:

determining whether or not a second SBW-to-PS mode switch condition is satisfied, the second SBW-to-PS mode switch condition being a condition that a speed of the vehicle is lower than or equal to a first threshold speed; and switching the control mode from the SBW mode to the PS mode when it is determined that both of the SBW-to-PS mode switch condition and second SBW-to-PS mode switch condition are satisfied, and wherein the control unit is configured to perform the following in the PS mode:

determining whether or not a second PS-to-SBW mode switch condition is satisfied, the second PS-to-SBW mode switch condition being a condition that the vehicle speed is higher than or equal to a second threshold speed; and switching the control mode from the PS mode to the SBW mode when it is determined that at least one of the PS-to-SBW mode switch condition and second PS-to-SBW mode switch condition is satisfied.

* * * * *